UNITED STATES PATENT OFFICE.

ROBERT F. NENNINGER, OF NEWARK, NEW JERSEY.

COMPOSITION FOR FLOOR AND WALL COVERINGS, &c.

SPECIFICATION forming part of Letters Patent No. 342,377, dated May 25, 1886.

Application filed October 13, 1885. Serial No. 179,795. (No specimens.)

*To all whom it may concern:*

Be it known that I, ROBERT F. NENNINGER, of Newark, Essex county, New Jersey, have invented a new and useful Improvement in Compositions for Floor and Wall Coverings, &c., of which the following is a specification.

My invention relates to a new and useful composition of matter which is adapted to a great variety of purposes—such as for floor and wall coverings, roof-coverings, as a substitute for leather, cork, or rubber, and building-sheathing—the said composition being an elastic flexible water-proof body, which may be pressed into desired form.

My composition consists of any fiber, preferably short, such as linen, cotton, hemp, or jute—as, for example, as prepared in pulp for paper-making—any material, such as hair or fur, from which felt is ordinarily made, mineral wool, the short lint from cotton-gins, and so on through a great variety of like substances, animal, vegetable, and mineral. With said fiber I combine any suitable water-proof resinous or gummy substance which can be dissolved in a volatile fluid—such as a light hydrocarbon—which hydrocarbon I subsequently cause to evaporate and so to be expelled from the mass. The fiber is then agglutinated by the gummy substance, and on drying there is produced a strong elastic flexible body, which may be pressed, if desired, into any suitable form.

As one embodiment of my invention, I may use as fiber paper-pulp in a dry state, and, as the permeating liquid, the gummy or resinous residue produced by heating linseed-oil to a high temperature, this residue being dissolved in a suitable hydrocarbon, which hydrocarbon is subsequently expelled from the mass by volatilization. The resulting body may be pressed into shape—as, for example, by passage between rollers—to form a flexible sheet.

In another application for Letters Patent filed simultaneously herewith, serially numbered 179,796, I have claimed the process of manufacturing the aforesaid composition as herein set forth. Said process is herein disclaimed.

I claim as my invention—

The composition of matter herein set forth, consisting of paper-pulp in a dry state, and the gummy viscous residue derived from heating linseed-oil, the same being intimately mingled and agglutinated into an elastic flexible mass, substantially as described.

ROBERT F. NENNINGER.

Witnesses:
PHILIP J. O'REILLY,
JOHN BRICE.